(No Model.)  F. S. BRIGGS.  2 Sheets—Sheet 1.
BABY CARRIAGE.
No. 444,519.  Patented Jan. 13, 1891.
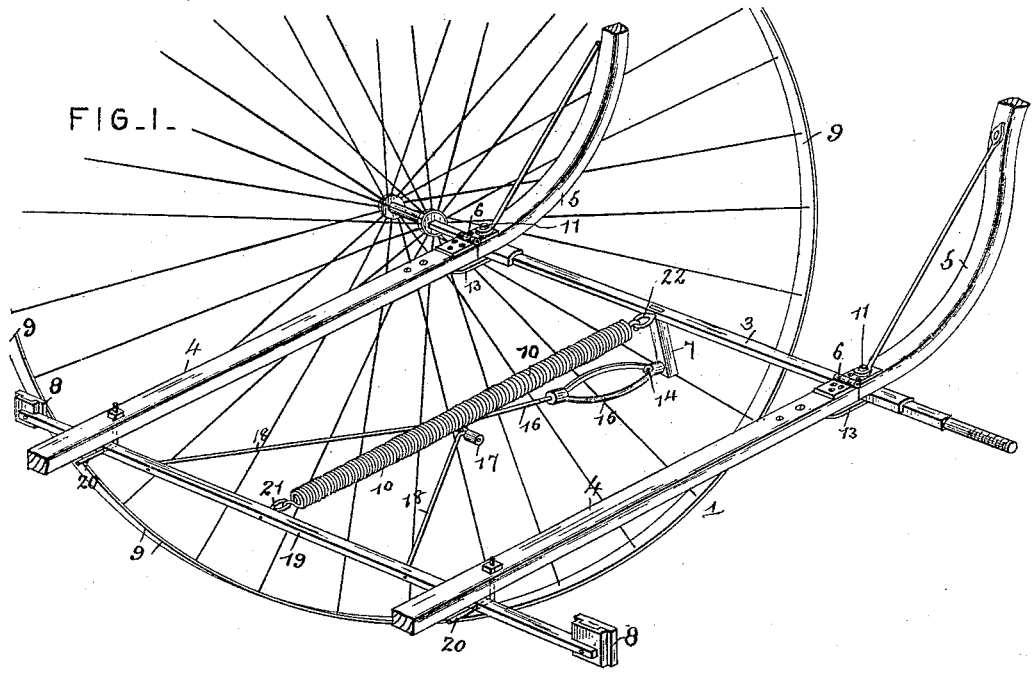
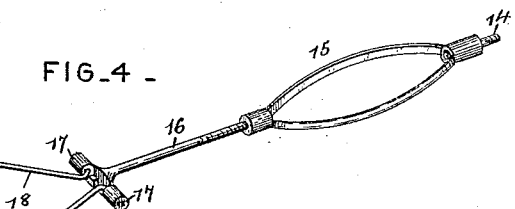
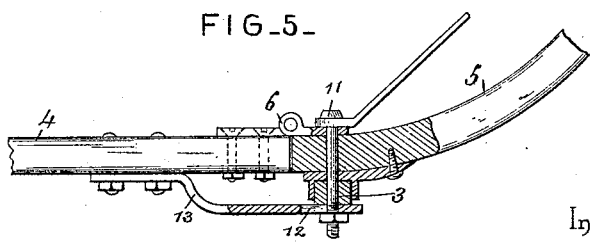
Witnesses  Inventor
Jas. R. McCathran  Franz S. Briggs
J. F. Riley  By his Attorneys,
C. A. Snow & Co.

(No Model.) F. S. BRIGGS. 2 Sheets—Sheet 2.
BABY CARRIAGE.

No. 444,519. Patented Jan. 13, 1891.

Witnesses
Jas. K. McCathran
S. T. Riley

By his Attorneys,
C. A. Snow & Co.

Inventor
Franz S. Briggs

UNITED STATES PATENT OFFICE.

FRANZ S. BRIGGS, OF NEW HAMPTON, IOWA.

BABY-CARRIAGE.

SPECIFICATION forming part of Letters Patent No. 444,519, dated January 13, 1891.

Application filed June 25, 1890. Serial No. 356,692. (No model.)

*To all whom it may concern:*

Be it known that I, FRANZ S. BRIGGS, a citizen of the United States, residing at New Hampton, in the county of Chickasaw and State of Iowa, have invented a new and useful Baby-Carriage, of which the following is a specification.

The invention relates to improvements in baby-carriages.

The object of the present invention is to provide an automatic brake for baby-carriages adapted to brake the wheels after the handles have been released and prevent the carriage accidentally rolling during the absence of the attendant, and thereby avoid injury to the occupant of the carriage.

The invention consists in the construction and novel combination and arrangement of parts hereinafter fully described, illustrated in the accompanying drawings, and pointed out in the claims hereto appended.

Figure 3:
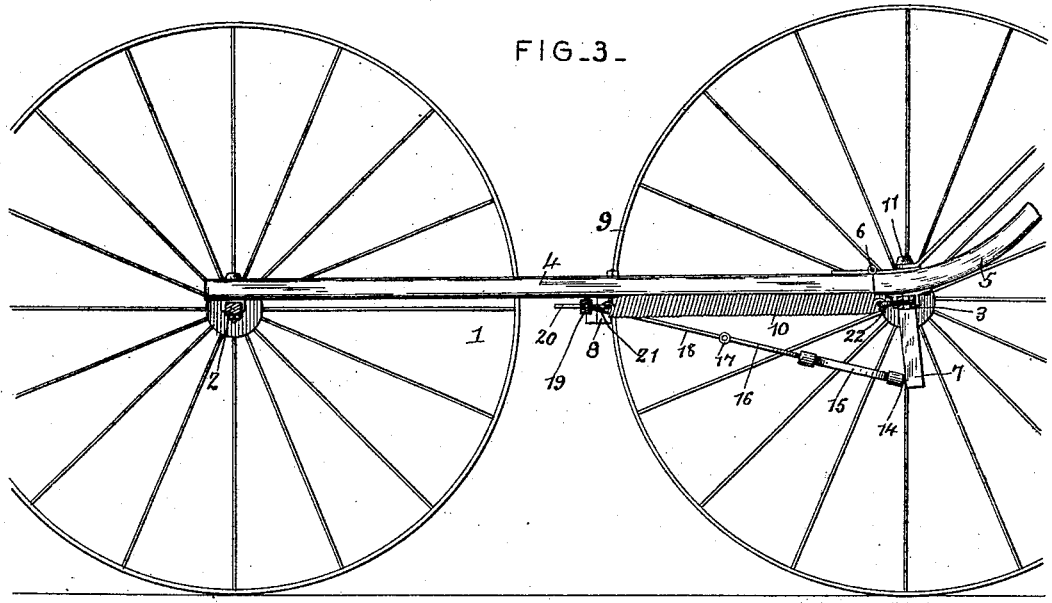
Figure 2:
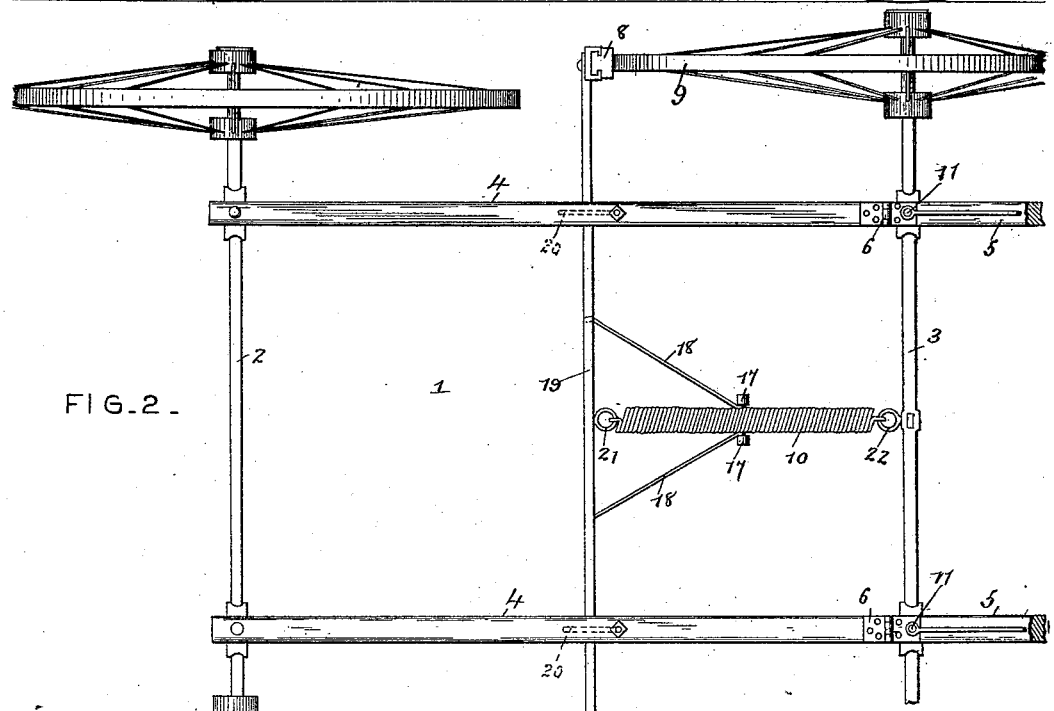

In the drawings, Figure 1 is a perspective view of a portion of the running-gear for baby-carriages, showing one wheel removed and provided with brake mechanism constructed in accordance with this invention. Fig. 2 is a plan view. Fig. 3 is a central longitudinal sectional view, partly in elevation. Fig. 4 is a detail perspective view. Fig. 5 is a detail sectional view illustrating the manner of securing the handle-bars and the rear axle.

Referring to the accompanying drawings, 1 designates the running-gear of an ordinary baby-carriage, consisting, essentially, of front and rear axles 2 and 3 and side bars 4, connecting the axles, and the rear axle has rigidly secured to it the handle-bars 5, that have their lower front ends connected to the side bars 4 by hinges 6, whereby when the handles are pressed upon in the usual manner while rolling the carriage the rear axle will be slightly turned sufficiently to throw the lower end of the bar 7, depending from the rear axle and connected with a brake-bar, forward and carry the brake-shoes 8 out of engagement with the rear wheels 9, and as soon as the handles are released the brake is automatically applied by a spiral spring 10. The rear axle is clipped to the handle-bar, and the bolt 11 extends through the handle-bar and axle and projects below the same and engages a longitudinal slot 12 of a bracket 13, secured to the adjacent side bar and extending rearward and bracing the rear axle and limiting the movement thereof. The bar 7 is secured to and depends from the rear axle and is approximately vertical, and is arranged about midway the length of the rear axle, and is provided on its front face, near its lower end, with a horizontal pin 14, to which is swiveled one end of a turn-buckle 15, that has its other end provided with a threaded opening and engaging the end of a rod 16, and the latter is provided at its front end with eyes or sockets 17, in which are secured the adjacent ends of divergent rods 18, that have their front ends secured to the brake-bar 19, extending across the running-gear and sliding upon guide-rods 20, and provided at its end with brake-shoes 8. The turn-buckle, the adjustable rod 16, and the divergent rods 18 form a rigid connection between the depending bar 7 and the brake-bar 19, and this connection can be increased and decreased in length to vary the distance which the brake-shoes are carried when the hinged handles are depressed in rolling the carriage, and by this means the brake-shoes may be carried forward just sufficient to clear the rear wheel, or may be moved a greater distance if desired. As soon as the handles are released the brake-shoes are carried into engagement with the rear wheels by the spiral spring 10, which has its ends secured to eyes 21 and 22, arranged, respectively, on the axle and the brake-bar. The guide-rods 20 are arranged beneath the side bars and extend through perforations of the brake-bar, and the rear ends of the rods are bent upward and extend through the side bars and are threaded and engaged by nuts, which secure the guide-rod to the side bars. The handle-bars are braced by rods having their front ends secured to the clips that fasten the rear axle, and their other ends are secured to the handle-bar beyond the lower curve or bend.

From the foregoing description and the accompanying drawings the construction, operation, and advantages of the invention will be readily understood.

Having thus described my invention, what I claim is—

1. The combination of a baby-carriage, a brake-bar provided at its ends with brake-shoes, a spring connected to the brake-bar and normally holding the same in engagement with the wheels, and the handle having the lower ends of its bars 5 rigidly secured to the rear axle and hinged to the side bar 4 and connected with the brake-bar to throw the same out of engagement with the wheels, substantially as described.

2. In a baby-carriage, the combination of the rear axle, the sliding brake-bar provided at its ends with brake-shoes, a spring adapted to throw the shoes into engagement with the wheels, the handle-bars having their lower ends hinged and secured to the rear axle and adapted to move the brake-bar, the depending bar secured to the rear axle, and the connection between the depending bar and the brake-bar, substantially as described.

3. In a baby-carriage, the combination of the rear axle, the sliding brake-rod provided at its ends with shoes, the spiral spring connecting the rear axle and the brake-rod and holding the shoes normally in engagement with the rear wheel, the hinged handle secured to the rear axle, the depending bar, and the adjustable connection between the depending bar and the brake-bar, said connection comprising the turn-buckle swiveled to the depending bar, the adjustable rod having one end engaged by the turn-buckle, and a diverging rod secured to the other end of the adjustable rod and to the brake-bar, substantially as described.

4. In a baby-carriage, the combination of the side bars, the handle-bars hinged to the side bars, the rear axle clipped to the handle-bar, the brackets secured to the side bar and bracing the rear axle and limiting the movement thereof, the guide-rods arranged beneath the side bars, the brake-bar provided with perforations receiving the guide-rod, the spring, and the connection between the rear axle and the brake-bar, substantially as described.

5. In a baby-carriage, the combination of the rear axle, the side bars 4, the sliding brake-bar provided at its ends with brake-shoes, a spring holding the shoes into engagement with the wheels, the handle-bars having their lower ends rigidly secured to the rear axle and hinged to the side bars 4, and the adjustable connection between the rear axle and the brake-bar, whereby when the handle-bars are depressed the brake-shoes will be held out of engagement with the wheels, substantially as described.

In testimony that I claim the foregoing as my own I have hereto affixed my signature in presence of two witnesses.

FRANZ S. BRIGGS.

Witnesses:
J. A. YARGER,
ANNA BRIGGS.